United States Patent [19]
Hashimoto

[11] Patent Number: 5,926,824
[45] Date of Patent: Jul. 20, 1999

[54] SYSTEM AND METHOD FOR RETRIEVING A DOCUMENT BY INPUTTING A DESIRED ATTRIBUTE AND THE NUMBER OF AREAS IN WHICH THE ATTRIBUTE OCCURS AS A RETRIEVAL CONDITION

[75] Inventor: Yasuhiko Hashimoto, Tokyo, Japan

[73] Assignee: Canon Kabushiki Kaisha, Tokyo, Japan

[21] Appl. No.: 08/557,466

[22] Filed: Nov. 14, 1995

[30] Foreign Application Priority Data

Nov. 16, 1994 [JP] Japan ................................ 6-281862
Nov. 30, 1994 [JP] Japan ................................ 6-296680

[51] Int. Cl.$^6$ ................................ G06F 17/30
[52] U.S. Cl. ................................ 707/520; 707/3; 707/4; 382/305
[58] Field of Search ................................ 395/784, 782, 395/934, 601, 606; 358/403; 364/225.4; 382/305, 306; 707/3, 4, 500, 502, 520, 522

[56] References Cited

U.S. PATENT DOCUMENTS

| | | | |
|---|---|---|---|
| 4,574,395 | 3/1986 | Kato | 382/306 |
| 4,803,643 | 2/1989 | Hickey | 395/774 |
| 5,129,011 | 7/1992 | Nishikawa et al. | 382/173 |
| 5,159,667 | 10/1992 | Borrey et al. | 395/761 |
| 5,361,204 | 11/1994 | McCollough et al. | 395/792 |
| 5,369,742 | 11/1994 | Kurosu et al. | 395/784 |

*Primary Examiner*—Joseph H. Feild
*Attorney, Agent, or Firm*—Fitzpatrick, Cella, Harper & Scinto

[57] ABSTRACT

A document image is divided into areas of every various attributes such as composition, photograph, chart, title, and the like. The attribute of each area and information indicating to which page of which document image each area belongs are managed by the data base. When the user inputs a desired attribute, the document image including the area having the inputted attribute is retrieved.

10 Claims, 15 Drawing Sheets

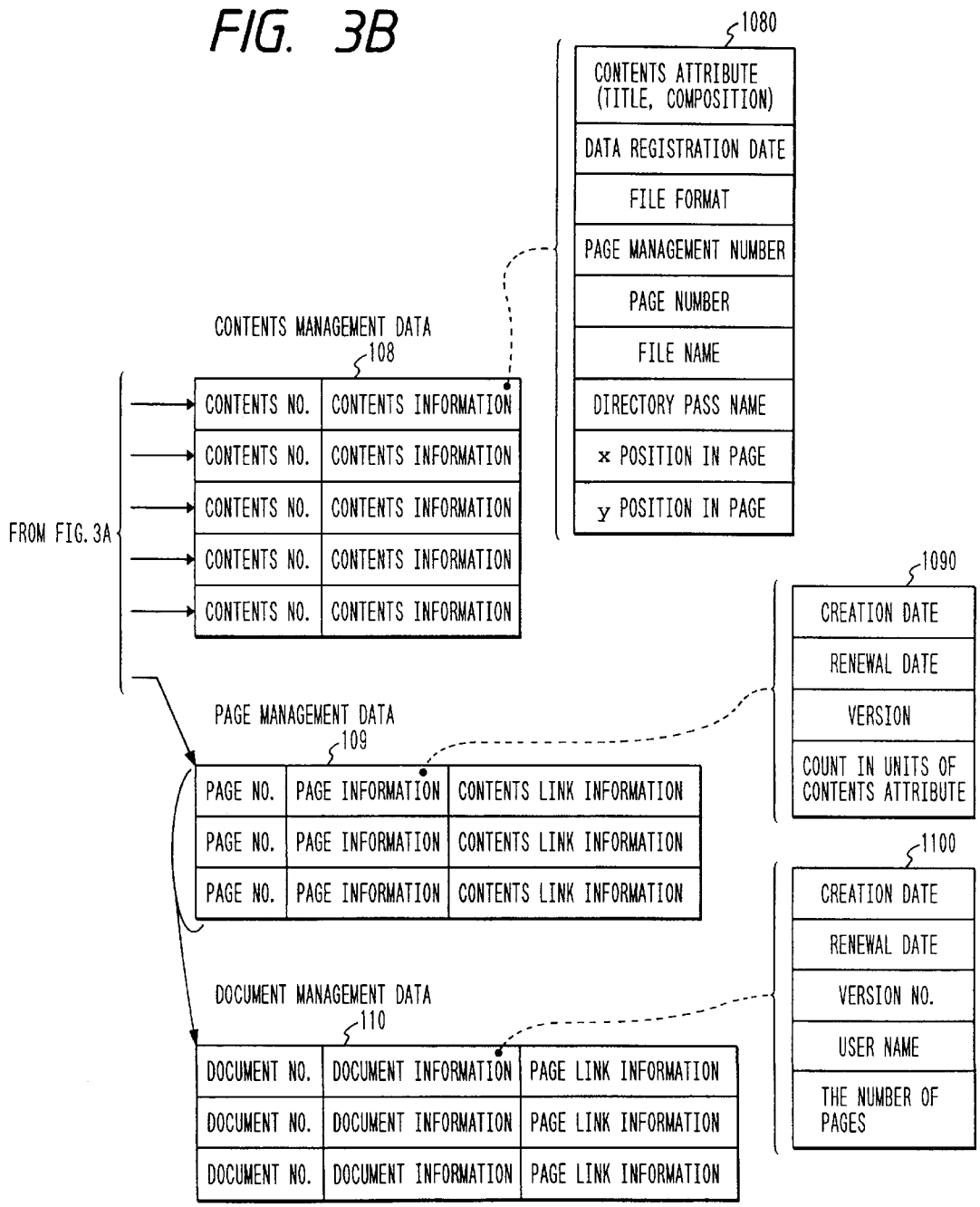

FIG. 7A

TITLE MANAGEMENT
DATA FORM 501

| CONTENTS NO. |
|---|
| CONTENTS NO. |
| . |
| . |
| . |

| TITLE | REGISTRATION DATE |
|---|---|
| TITLE 1 | 1994. 1. 1 |
| TITLE 2 | 1994. 1. 2 |
| TITLE 3 | 1994. 1. 3 |

SYSTEM AND METHOD FOR RETRIEVING A DOCUMENT BY INPUTTING A DESIRED ATTRIBUTE AND THE NUMBER OF AREAS IN WHICH THE ATTRIBUTE OCCURS AS A RETRIEVAL CONDITION

BACKGROUND OF THE INVENTION

1. Field of the Invention

The invention relates to an electronic filing system for storing document images into a memory medium and for retrieving document images from the memory medium.

2. Related Background Art

At present, in association with the spread of computers and computer peripheral apparatuses such as scanner, printer, and the like, since it is necessary to effectively use office space and to effectively share and use data, there are many opportunities for analog information on paper, which currently accounts for most office information, to be converted into digital data and stored into a memory device such as a hard disk, magnetooptic memory device, or the like, and then to be used as document data with a computer.

Also, however, document data created by general application software such as a word processor or a DTP (desk top publishing) program on a computer, its amount is increasing more and more in association with the widespread of the personal computer.

Therefore, there are many opportunities such that an electronic filing system or a document management system is introduced for the purpose of managing a large quantity of document data.

In such a situation, how to retrieve target document data from the large quantity of document data which was registered and managed becomes a large problem in document management.

This being the case, a document retrieval method of a conventional electronic filing system shown in FIG. 16 will now be described.

When an instruction for retrieval is issued by the user (step 801), retrieval condition is first set. The setting of the retrieval condition is divided into a setting of text retrieval condition (802) to retrieve from text data in the stored document and a setting of retrieval condition (803) by document attributes such as document name, document creation date, document creator, document keyword, or the like. When the retrieval condition is set, the retrieval is executed by an instruction to execute the retrieval from the user.

In an execution of the text retrieval (804), for the text data in each document managed by an electronic filing system, the text data is sequentially compared with a retrieval character train inputted in step 802 or, if index data of the text data has been formed, the text data is collated with text index data, thereby retrieving the text.

In an execution of the retrieval by document attributes (805), a retrieval is performed by comparing document attribute data managed by the electronic filing system and the retrieval condition set in step 803, thereby judging whether the document attribute data coincides with the retrieval condition or not.

The text which coincides with the retrieval conditions as results of the text retrieval and document attribute retrieval is displayed on a display (806). One retrieval is now finished (807).

However, according to the construction shown in the above conventional technique, the management unit of the document image data digitized by an image input apparatus is nothing but the data of one page unit. In the case where areas of various attributes such as "title", "nature image", "line diagram", etc., are included in one page, the information or data for each of those areas cannot easily be effectively used. Particularly, in the case of a newspaper, magazine, or the like, since many photographs and the like as well as characters are included in one page, using one page as a unit is a data management method which is not sufficiently flexible in terms of the reuse of data and the reconstruction of data.

According to the retrieval method shown in the above conventional technique, for example, in the case where the user cannot remember a character train included in a document to be retrieved, it is not easy to retrieve the target document.

In such a case, even where, for example, an image and a chart are included in the document and the user remembers that fact, the conventional retrieval method provides no means for retrieving by effectively using document construction data such as the image or chart, and it is impossible fully to meet demand for retrieving by various methods for each user.

Further, it will be obviously understood that position information of the document construction data indicating at which position in the page the image or chart is located, is also not used for retrieval.

As will be understood from the situation of the above conventional retrieval method, information which can be used for retrieval includes only the text information in the document or the data added as document attributes later. The construction information of the document indicating at which position in a page the rectangular area of a certain attribute in the document such as an image, chart, or the like is located, is not used for retrieval. A sufficient retrieval method is not afforded to the user.

SUMMARY OF THE INVENTION

It is an object of the invention to provide electronic filing system and method which can eliminate the foregoing drawbacks.

Another object of the invention is to provide electronic filing system and method which can retrieve a document in accordance with attributes of a document construction.

Still another object of the invention is to provide electronic filing system and method, in which a document image stored in a memory medium is linked to another document image on an area unit basis in a document of one page, thereby improving a use efficiency.

The above and other objects and features of the present invention will become apparent from the following detailed description and the appended claims with reference to the accompanying drawings.

BRIEF DESCRIPTION OF THE DRAWINGS

FIGS. 7A and 7B are diagrams showing an example of management data and retrieval display for realizing a document management method according to preferred embodiment 2 of the invention;

DETAILED DESCRIPTION OF THE PREFERRED EMBODIMENTS

The preferred embodiments of the present invention will now be described in detail hereinbelow with reference to the drawings.

Figure 1:
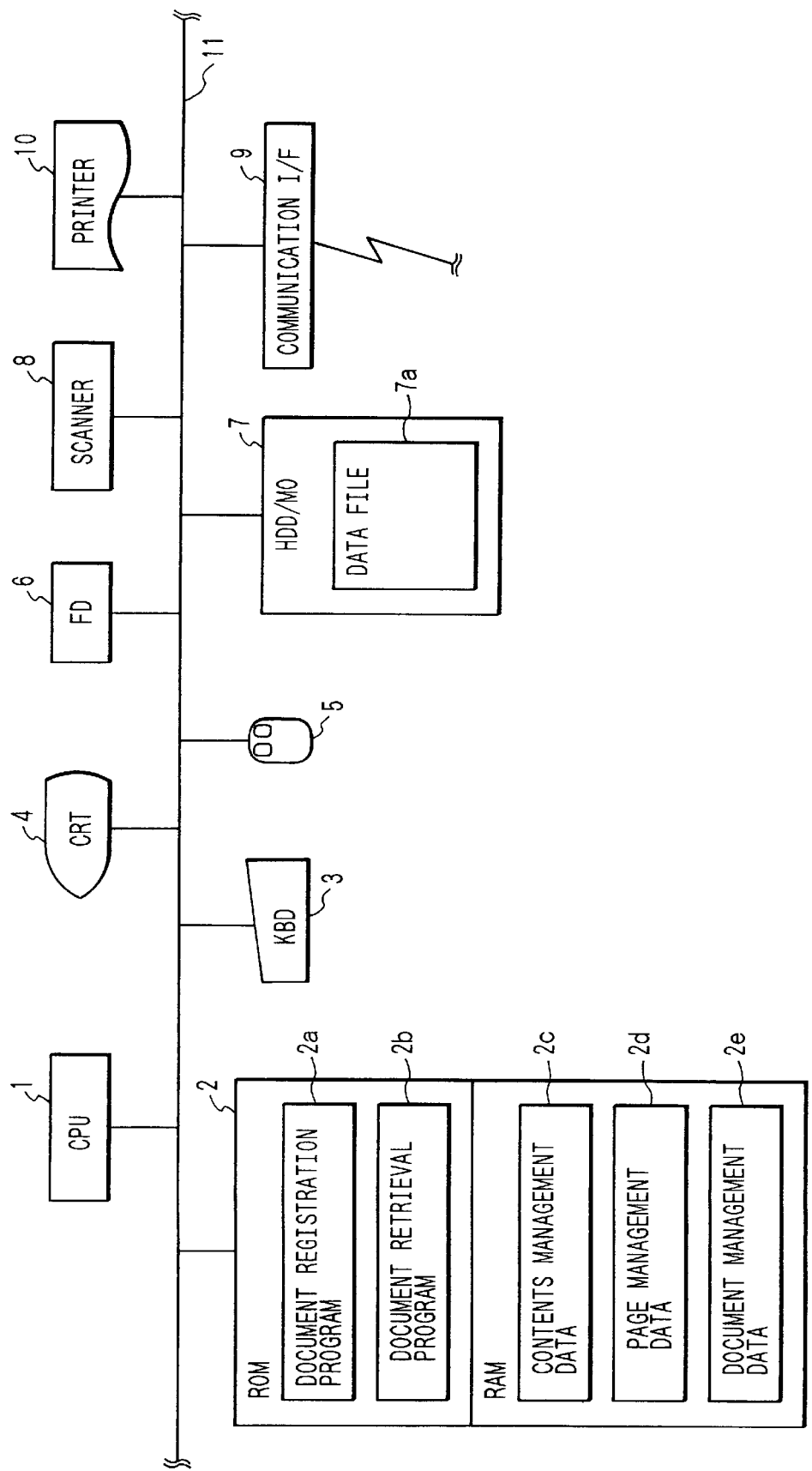
FIG. 1 is a system constructional diagram of a document processing apparatus.

FIG. 1 is a system constructional diagram of an electronic filing system of the embodiment.

In the diagram, reference numeral 1 denotes a central processing unit (CPU) for arithmetic operation and control and 2 indicates a memory unit such as ROM, RAM, or the like. For example, document management programs such as document registration program 2a, document retrieval program 2b, and the like have been stored in the ROM. Contents management data 2c, page management data 2d, and document management data 2e have been stored in the RAM. Reference numeral 3 denotes a keyboard (KBD) for inputting data or command; 4 a display unit (CRT) for displaying document information, pointing icon, or the like; 5 a mouse for clicking the displayed pointing icon or for moving a cursor; 6 a floppy disk (FD) for storing a program or the like to be loaded into the RAM and executed; and 7 an external memory device such as hard disk (HDD), magnetooptic disk (MOD), or the like for storing a data file 7a of a document. The data file 7a is managed on the basis of each of plural management data that are preferably stored in the RAM. Reference numeral 8 denotes a scanner for reading a document image; 9 a communication interface for transmitting and receiving document information; and 11 a bus for connecting each of the above component elements.

Figure 2:
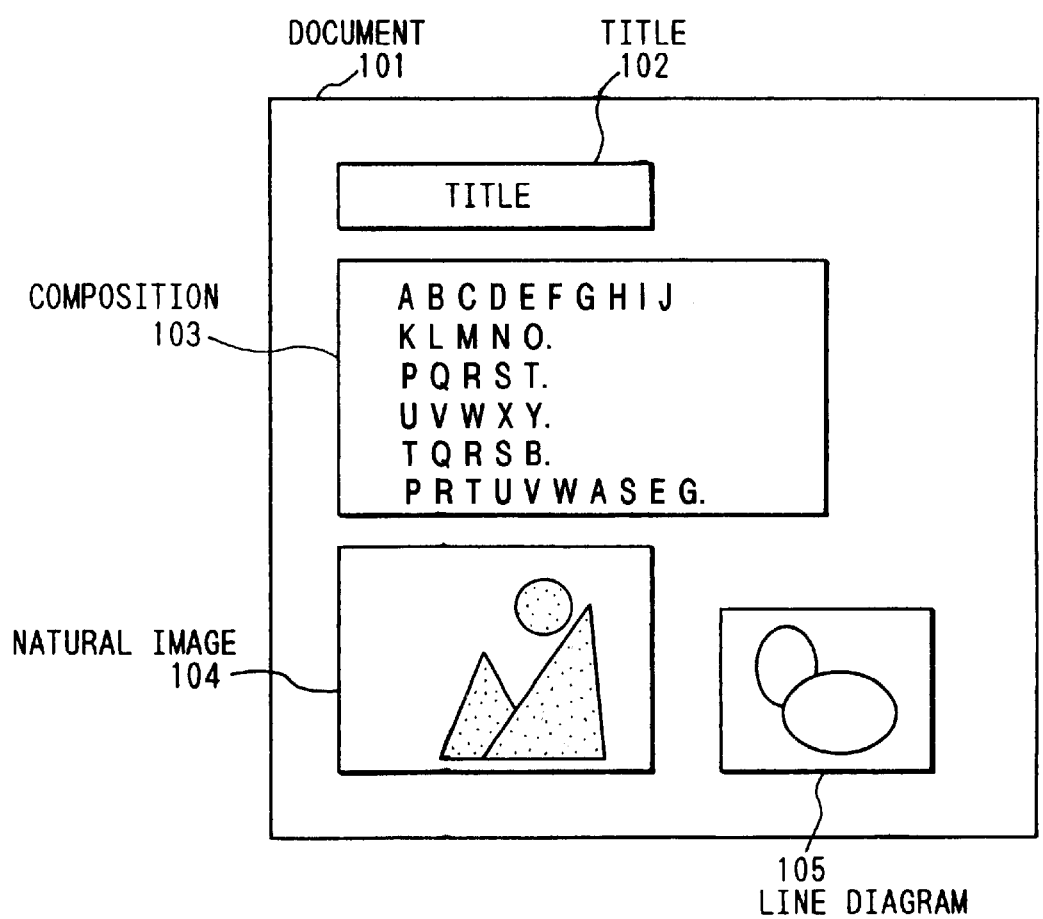
FIG. 2 shows an example of a paper (document) for explaining a document management method.

FIG. 2 is an example showing an area having which attribute exists in one page of the document. Areas having attributes of "title" 102, "composition" 103, "nature image" 104, and "line diagram" 105 exist in a document 101. The attributes of those areas are set on the basis of a use form for each user who manages the document. The user can designate an area and an attribute of such an area. The system can also automatically judge the attribute and area in accordance with the program.

Embodiment 1

Figures 3, 3A:
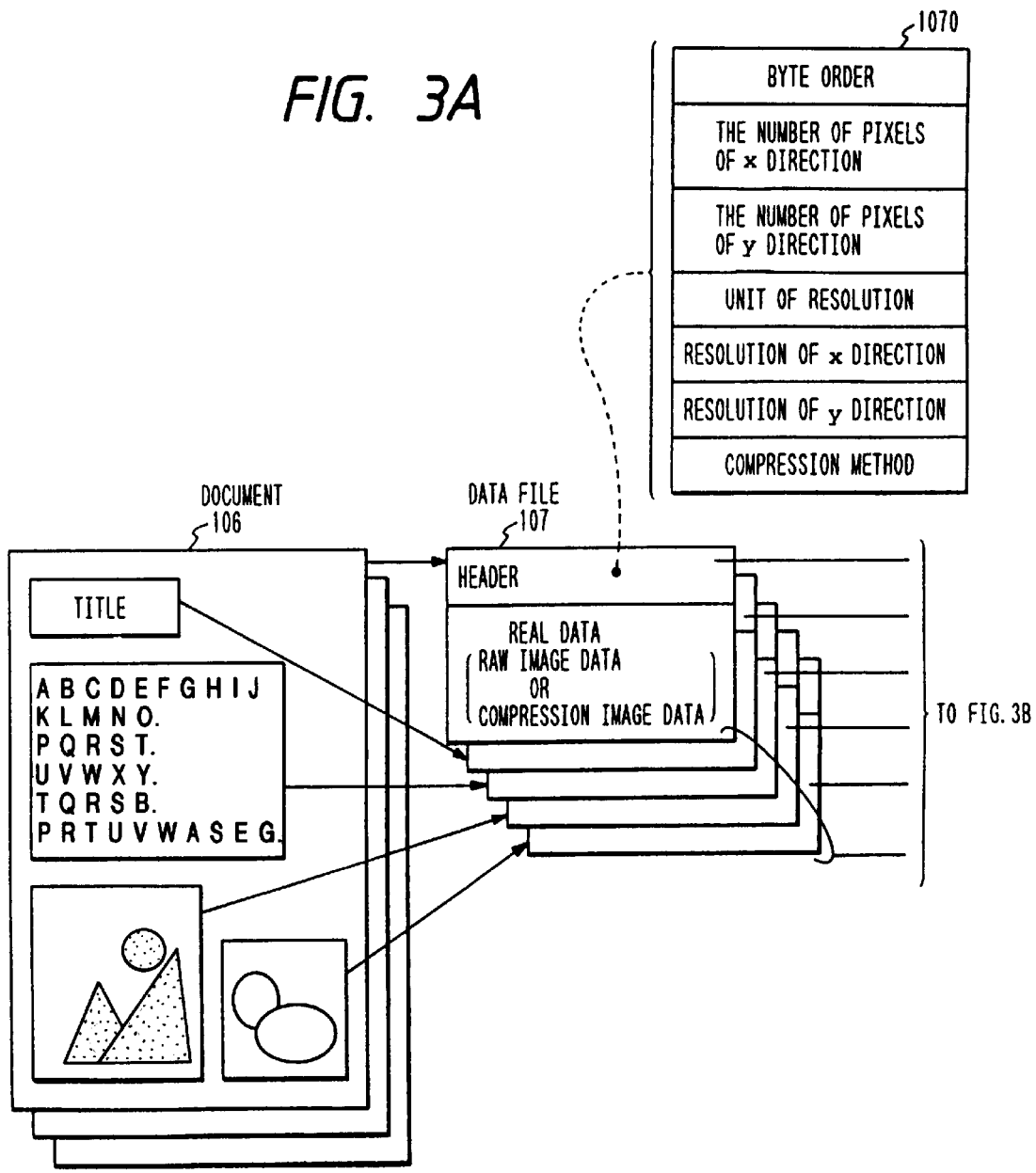
FIG. 3 which is composed of FIGS. 3A and 3B is a constructional diagram for explaining management data to realize the document management method according to preferred embodiment 1 of the invention.

FIGS. 3A and 3B show a construction of management data for managing the document shown in FIG. 2.

A document 106 is read by the image input device such as a scanner 8 or the like connected to the computer and is converted to digital data. Attribute judgment information ("title" or the like) and area judgment information as shown in the document 101 in FIG. 2 are obtained by an instruction from the user or a program.

A data file 107 shown in FIG. 3A is a file formed as data for each attribute and shows an example of a file form in a case where it is actually preserved in a storage device such as a memory device 7 like a hard disk, magnetooptic disk, or the like. As an example of information of a header portion 1070 of the data file 107, such information includes "byte order", "the number of pixels in the x direction", "the number of pixels in the y direction", "unit of resolution", "resolution in the x direction", "resolution in the y direction", "compression method", and the like which are different in dependence on the kind of CPU of the computer. "Raw image data" or "compression image data" compressed by various compression methods exists in a real data portion. Although one data file 107 is allocated to one content in one page of the document 106, one data file 107 can be also obviously allocated to one page of the document. In this case as well, however, the minimum unit of the data management is the data formed in each area of various attributes.

Contents management data 108 is data for managing the information for each content in the information of the data file 107. The contents management data 108 has "contents No." added to every unit of contents data of the data file 107 and each unit of contents information 1080.

The contents information 1080 includes: "contents attribute" indicative of the attribute of the contents such as "title" or "composition"; "file format" indicative of a file form of the data file; "page No." indicating that the content is a content included in which page by the number to manage the page; "file name" of the data file 107; "directory path name" indicating at which location in the filing system the data file 107 exits; "x position in the page" and "y position in the page" indicating at which position of one page the data of the data file 107 exists; and the like.

Page management data 109 is a data base for performing the management every page constructed by a plurality of contents by managing the link information of each content included in each page in the information of the contents management data 108 described above. The page management data 109 includes: "page No." added in the management data every page; page information 1090 for each page; and "contents link information" as information indicating in which page which "contents No." shown in the contents management data 108 is included in order to perform the management of the contents constructing one page.

The page information 1090 includes: "creation date" at which the data of the page was created; "renewal date" at which the data of the page was updated; "version" of the data of the page; "count in units of contents attribute" indicating how many contents are included every attribute of the contents included in one page; and the like.

Document management data 110 is a data base for performing the management every document constructed by a plurality of pages by managing the link information of each page in the information of the page management data 109 described above. The document management data 110 includes: "document No." added as a serial number in the management data every document; document information 1100 for each document; and "page link information" indicating to which "page No." of the page management data which page of the document corresponds in order to manage the page constructing the document.

The document information 1100 includes: "creation date" at which the document was created for the first time; "renewal date" indicating the date when the document was updated; "version No." indicative of the version of the document; "user name" indicative of the registrant of the document; "the number of pages" of the whole of the document; and the like.

Figure 4:
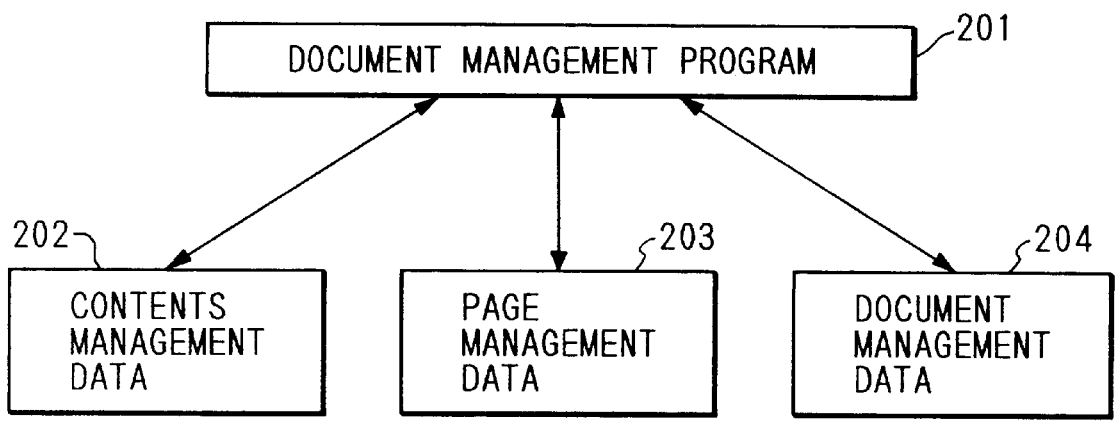
FIG. 4 is a constructional diagram of a program showing the document management method according to embodiment 1.

FIG. 4 shows a constructional diagram of a program for realizing a document management method of the embodiment on the basis of each management data shown in FIGS. 3A and 3B.

A document management program 201 manages an addition, a deletion, a renewal, and the like of the data file of the document while managing contents management data 202 having the contents management data 108, page management data 203 having the page management data 109, and document management data 204 having the document management data 110.

Figure 5:
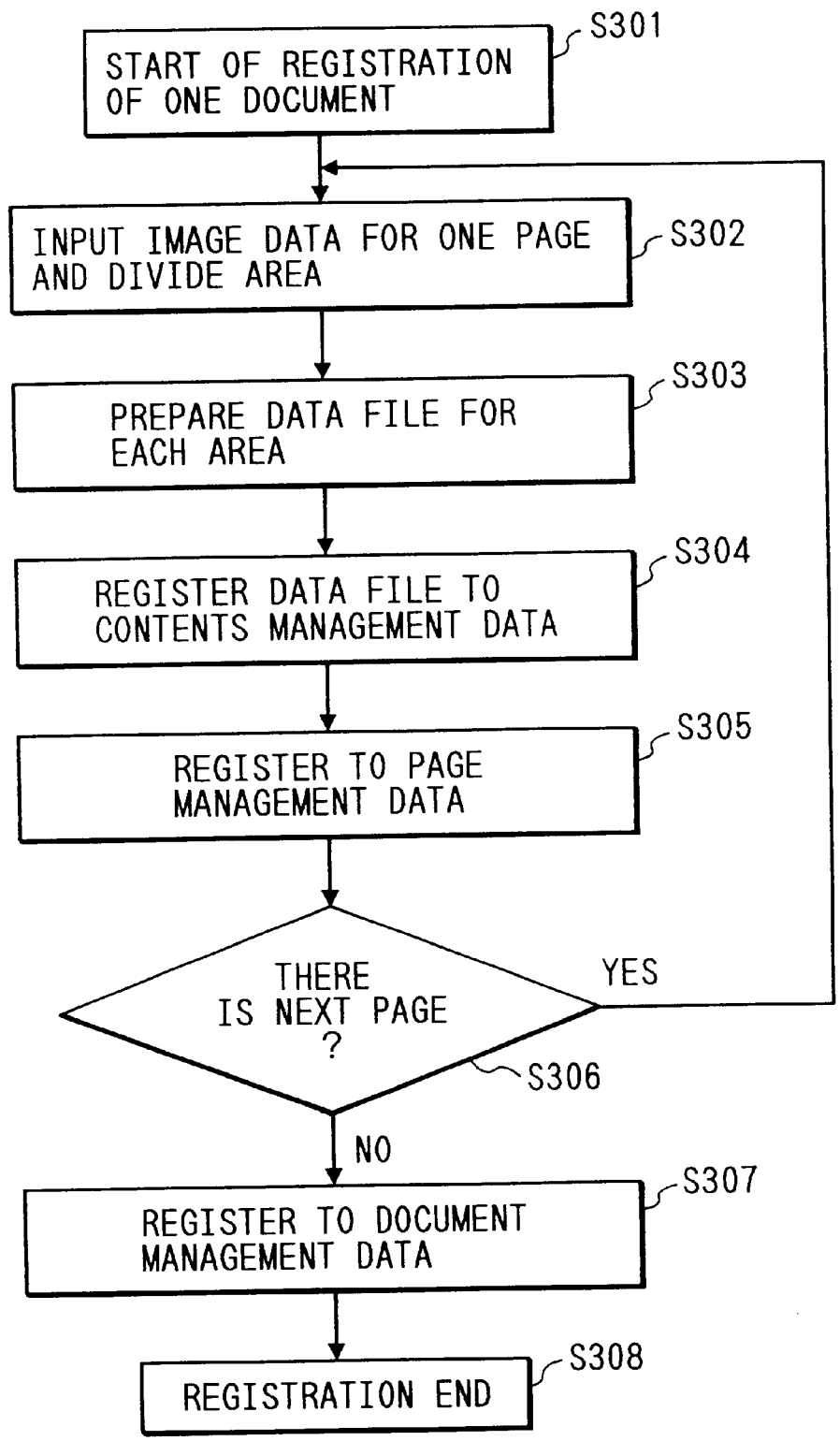
FIG. 5 is a flowchart showing a procedure of a document registration method according to embodiment 1.

FIG. 5 is a flowchart showing processes in case of registering the document in accordance with the document management program 201 shown in FIG. 4. It is now assumed that the document image data obtained by reading the document by the image input device and converting into the digital data has already been prepared.

In step S301, a registration of one new document is started. In step S302, the input image data of one page is inputted to the document management program 201. For the inputted data, the user can designate the attribute and the area in each attribute on the basis of the use form for each user, or the attribute and the area for each attribute can be also automatically designated by a program.

In step S303, the data file 107 in each of the divided areas is formed. In step S304, the management information of the data file 107 is registered into the contents management data 202. In step S305, the link information, page number information, and the like of each content are registered into the page management data 203 on the basis of the contents management data 202.

In step S306, when there is a next page, the processing routine is returned to step S302 and the processes in steps S302 to S305 are repeated. When there is not additional data, in step S307, the link information, document number information, and the like of each page are registered into the document management data 204 on the basis of the page management data 203. The document registration in step S308 is finished.

Figure 6:
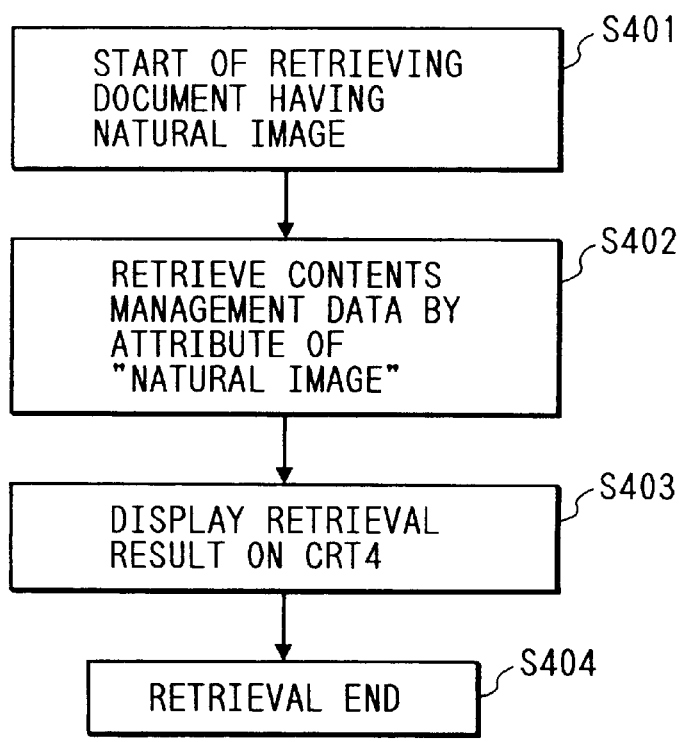
FIG. 6 is a flowchart showing a procedure of the document retrieval method according to embodiment 1.

FIG. 6 is a flowchart showing processes in case of retrieving the document in accordance with the document management program 201 shown in FIG. 4. For example, in the case where the nature image 104 is designated as an attribute of the contents in the document, the following document retrieval can be performed.

When the retrieval of the document having a nature image is started in step S401, the retrieval of the contents management data 203 is performed on the basis of the attribute of "nature image" in accordance with the document management program 201 in step S402. The retrieval result is displayed on the CRT 4 in step S403. The retrieval is finished in step S404. As a result of retrieval which is displayed on the CRT 4, there are information of the document which includes the nature image and is managed by the document management data 204, information of the page managed by the page management data 203, and information of the contents managed by the contents management data 202.

Embodiment 2

FIGS. 7A and 7B show an example of management data to realize another document management method and a retrieval display example according to the invention.

FIG. 7A shows an example of a title management data form 501 in case of reconstructing data for "title" as an example of the attributes as one of the contents on the basis of the contents management data 202. As for the title management data form 501, the items having the attribute of "title" are extracted from the items of "contents attributes" as one item of the contents management data form 108 shown above and are arranged, and the result is set to a management data form only for "title".

In FIG. 7B, reference numeral 502 denotes a display example of title data which was retrieved on the basis of the data formed by the title management data form 501. By constructing the management data only for each attribute, the retrieval can be performed at a high speed.

Embodiment 3

Figures 8A, 8B:
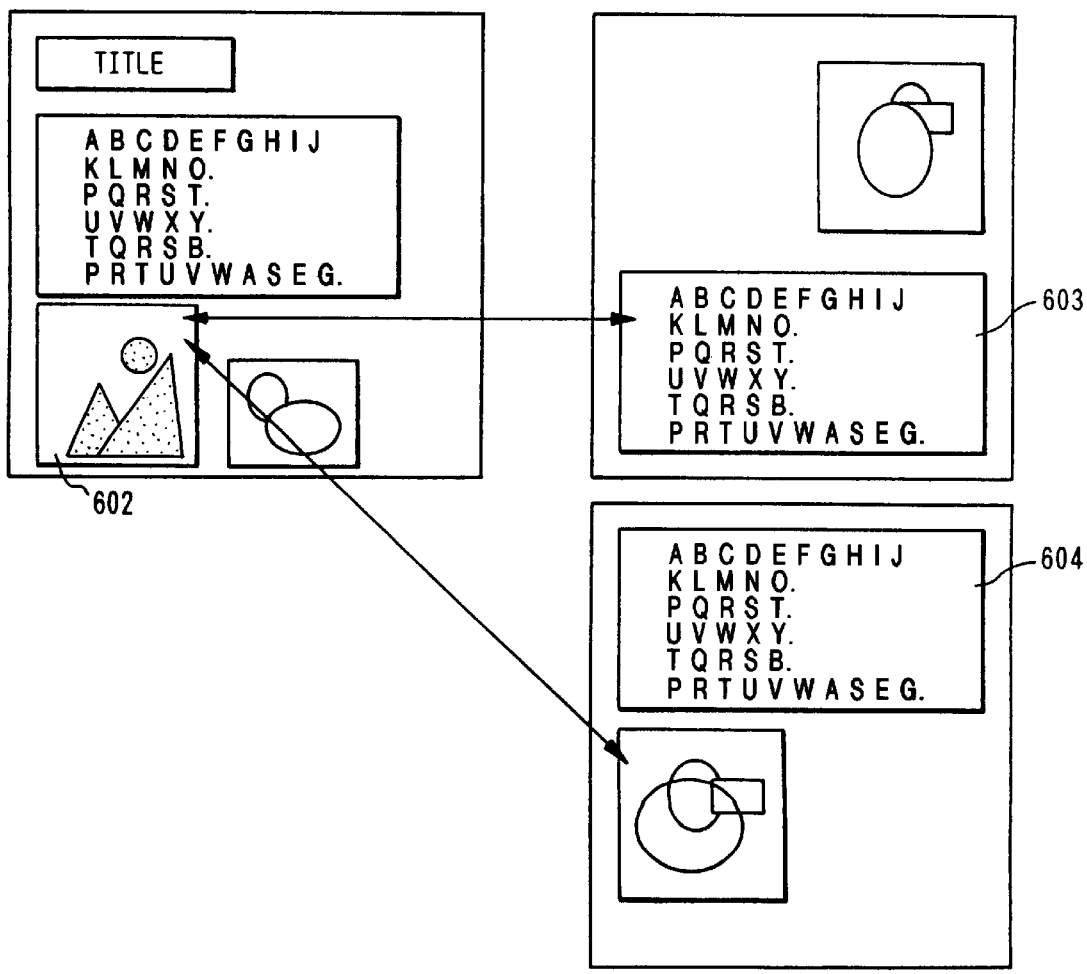
FIGS. 8A and 8B are diagrams showing a link example of management data and contents for realizing a document management method according to preferred embodiment 3.

FIGS. 8A and 8B show an example of management data to realize further another document management method and a link example of the contents according to the invention.

FIG. 8A shows an example of a contents link management form in the case where the contents and the link information with the contents are newly formed. A contents link management form 601 comprises: "link No." added to manage the link information of the contents by the document management program 201; and two "contents No." indicative of the contents of the link.

FIG. 8B shows a state in which contents 603 and 604 are linked to contents 602. The user can not only set the link information on a page unit basis but also set the link information for each contents included in the page. That is, the contents 603 and 604 can be extracted from the contents 602. Contrarily, the contents 602 can be easily extracted from the contents 603 and 604.

The digital image data serving as a source of the management target data is not limited to the data read by the image input device such as a scanner or the like but it is also possible to use the image data obtained by converting software data formed by a word processor software on the computer, a desk top publishing (DTP) software, or the like.

The present invention can be applied to a system constructed by a plurality of apparatuses or to an apparatus comprising one equipment. The invention can be also obviously applied to a case where the invention is accomplished by supplying a program to a system or an apparatus.

Embodiment 4

Another retrieval method using the attribute of the area will now be described.

Figure 9:
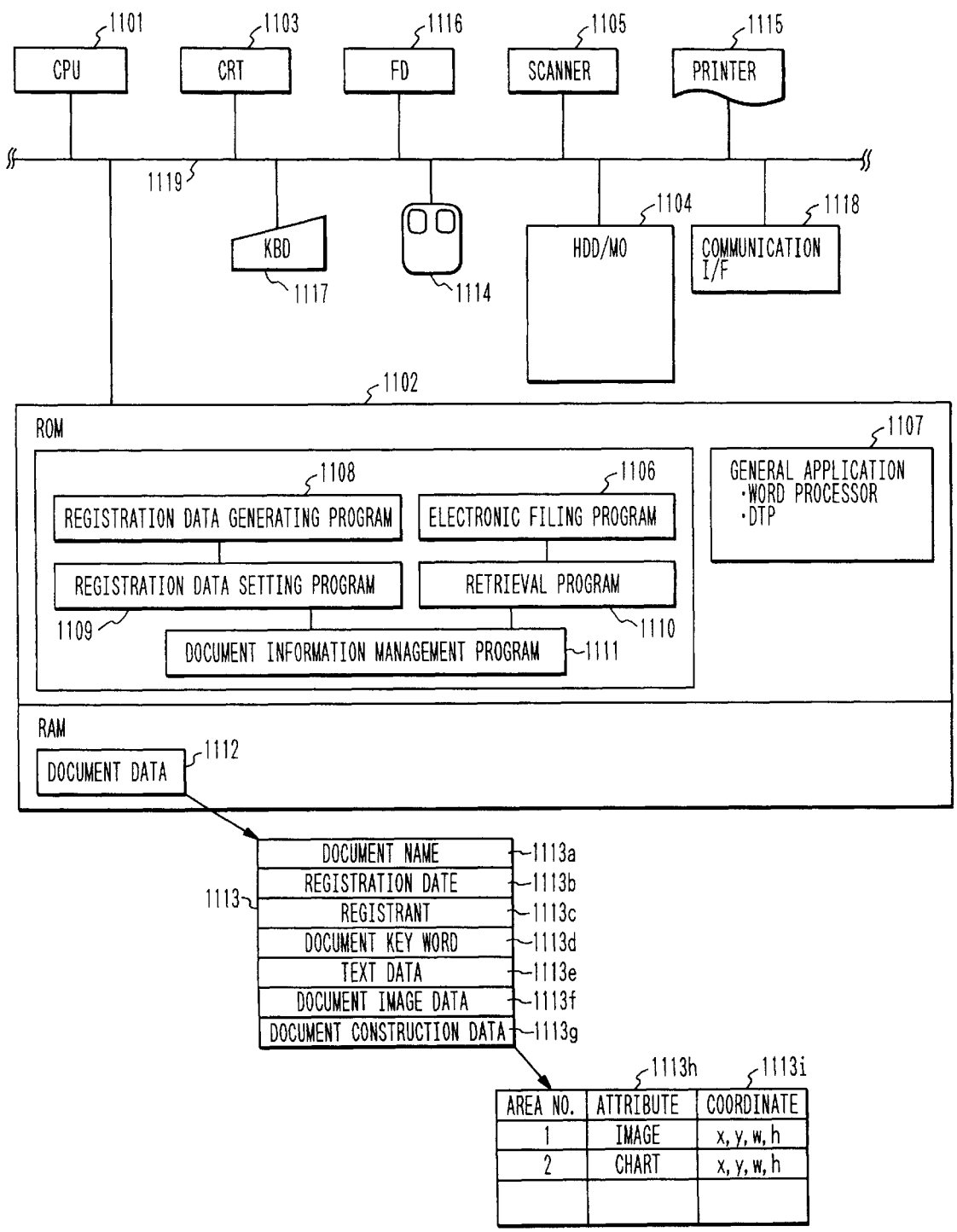
FIG. 9 is a system constructional diagram showing a construction of an electronic filing system according to embodiment 3 of the present invention.

FIG. 9 is a system constructional diagram of an electronic filing system of this embodiment. Reference numeral 1101 denotes a central processing unit (CPU) for arithmetic operations and control and 1102 indicates a memory unit such as ROM, RAM, or the like. For example, an electronic filing program 1106 and a general application program 1107 have been stored in the ROM. Document data 1112 which is managed by the electronic filing program 1106 has been stored in the RAM. Reference numeral 1103 denotes a display unit (CRT) for displaying document data, retrieval result, pointing icon, or the like; 1104 an external memory device such as hard disk (HDD), magnetooptical disk (MOD), or the like for storing a data file formed by the electronic filing program 1106 or general application program 1107; 1105 a scanner for reading an original image and for converting into digital data; 1117 a keyboard (KBD) having keys for inputting a document or instructing by the operator; 1114 a pointing device for clicking the displayed pointing icon or moving a cursor; 1115 a printer for printing document data; 1118 a communication interface for transmitting and receiving document data; and 1119 a bus for connecting each of the above portions.

The electronic filing program 1106 is constructed by a registration data generating program 1108, a registration data setting program 1109, a retrieval program 1110, and a document data management program 1111.

According to the registration data generating program 1108, text data of a document to be registered, registration day and time of the document, and further, document construction data and the like, which will be explained hereinbelow are automatically formed.

When the registration document is document image data converted to digital information, the text data of the document is obtained by recognizing characters for the document image data. When the registration document is formed by a commercially available application program of a word processor or the like, by executing a print processing routine installed as a standard routine in an operating system of the computer, the text data in the data formed by the application program can be obtained.

According to the registration data setting program 1109, a setting of document attribute information for a document management such as document name, document keyword, registration user, and the like of the registration document or a correction of the data formed by the registration data generating program 1108 are executed by the user of the electronic filing system. Finally, the document management data generated or set by the registration data generating program 1108 or registration data setting program 1109 is registered into the data base in the external memory device 1104. As shown in the details 1113 of the document data 1112, through the document data management program 1111, the document management data is constructed by: a document name (1113*a*); a registration date (1113*b*); a registrant (1113*c*); a keyword (1113*d*) added to the document; text data (1113*e*) of the document; image data (1113*f*) of the document; document construction data (1113*g*); and the like. In the above document data, particularly, the document construction data (1113*g*) has information of an attribute (1113*h*) and a coordinate (1113*i*). Such a state will now be specifically described with reference to FIG. 11.

Figure 11:
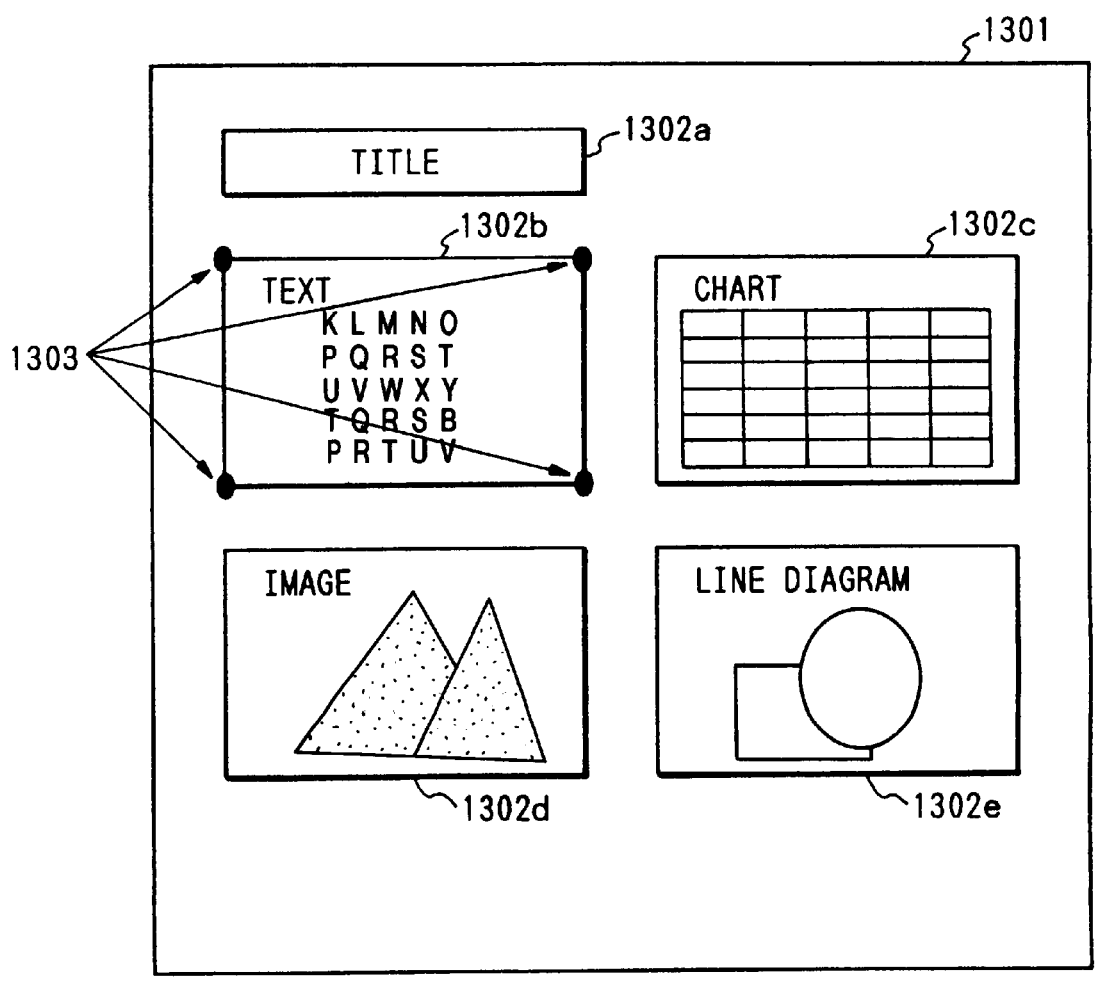
FIG. 11 is a diagram showing a document construction according to embodiment 3.

Reference numeral 1301 denotes contents of one page of the document. The contents of one page comprises areas having the attributes (1113*h*) such as title area (1302*a*), text area (1302*b*), chart area (1302*c*), image area (1302*d*), line diagram area (1302*e*), and the like. Those areas also have coordinates information 1303 (1113*i*) in the page. The area having the above attributes is called document construction data and the document is constructed by the document construction data as shown in FIG. 11.

Figure 10:
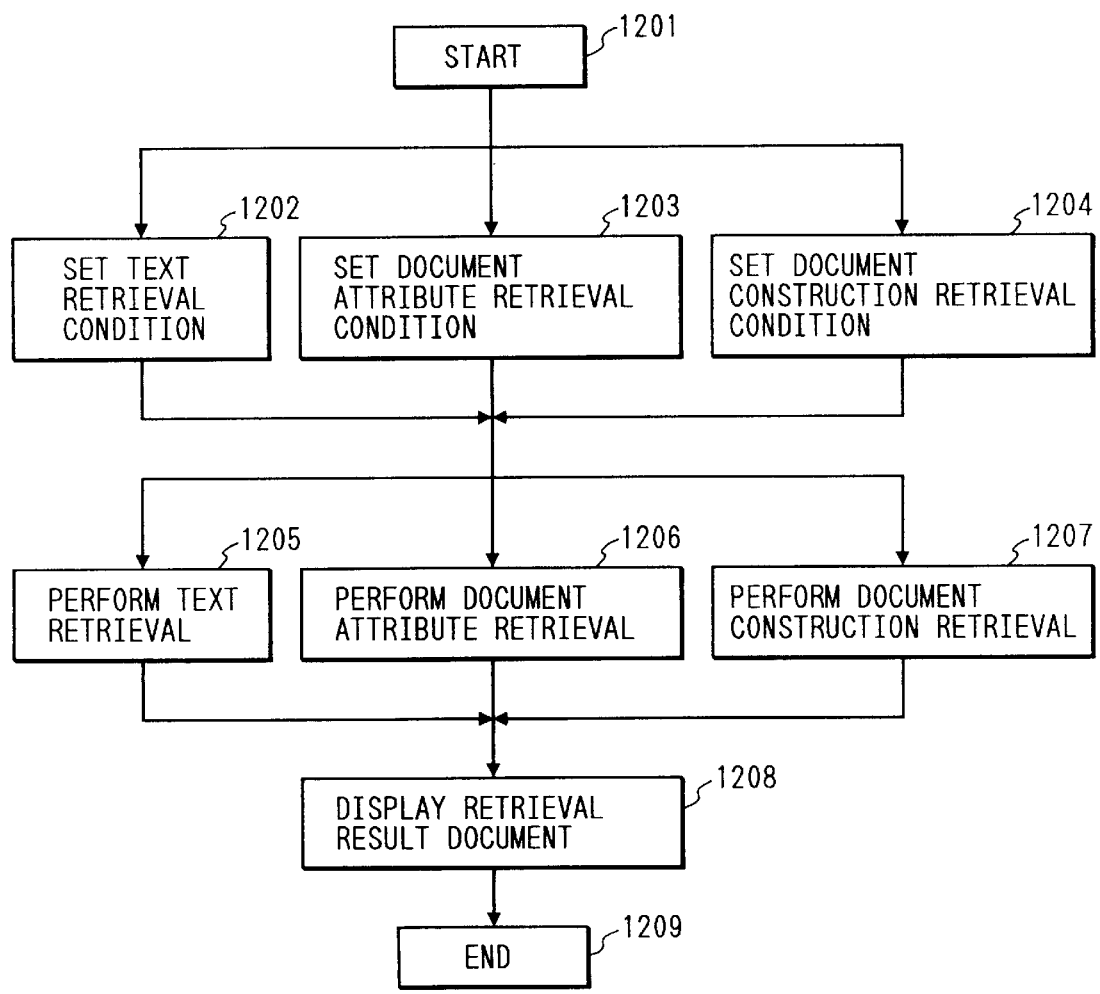
FIG. 10 is a flowchart for a retrieval method according to embodiment 3 of the invention.

The operation by the retrieval program 1110 will now be described with reference to FIG. 10. An instruction of the retrieval is generated by the user (step 1201). First, a retrieval condition is set. The setting of the retrieval condition is divided into a setting of text retrieval condition (1202) for retrieving text information of the registration document, a setting of retrieval condition (1203) by the document attributes such as document name, document creation date, document creator, document keyword, and the like, and a setting of retrieval condition (1204) by the document construction shown in FIG. 11. When the retrieval condition is set, the retrieval is executed by the instruction to execute the retrieval from the user.

In the execution of the text retrieval (step 1205), the text data of each document managed by the document data management program 1111 is sequentially compared with a retrieval character train inputted in step 1202 for setting the text retrieval condition, thereby retrieving the text. Or, when the index information of the text information has already been formed, by collating the input character train with the index information, the text is retrieved.

In the execution of the retrieval by the document attribute (step 1206), the document attribute data managed by the document data management program 1111 is compared with the document attribute retrieval condition set in step 1203, thereby retrieving.

In the execution of the retrieval by the document construction (step 1207) as well, the document construction data managed by the document data management program 1111 is compared with the document construction retrieval condition set in step 1204, thereby retrieving.

In the setting of the retrieval condition and the execution of the retrieval mentioned above, the setting of retrieval condition and the execution of the retrieval using the document construction data which characterize the present invention will now be described hereinbelow.

Figure 14:
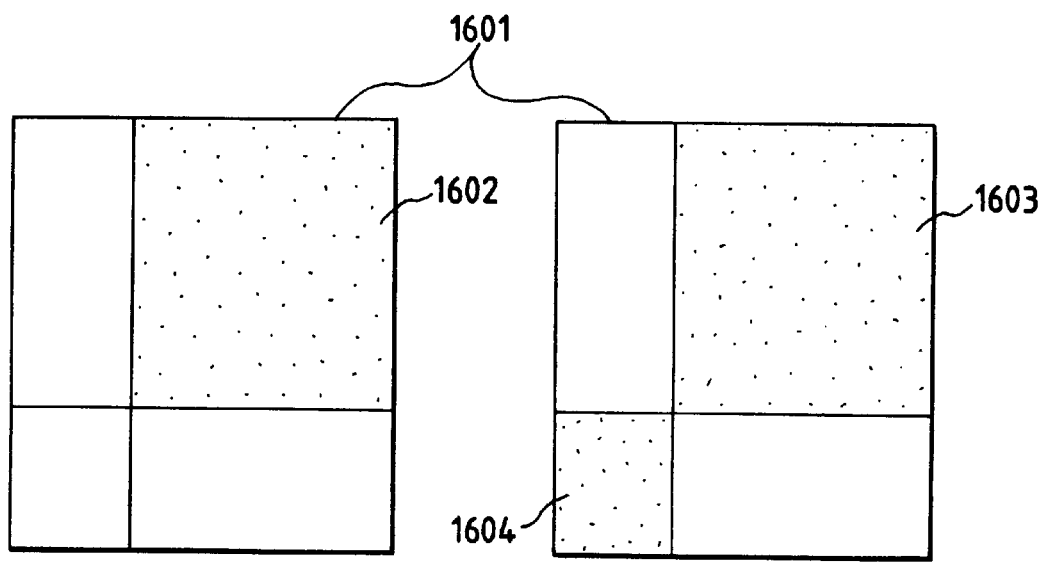
FIG. 14 is a diagram showing attributes of the document construction according to embodiment 3.

First, setting step 1204 of the retrieval condition of the document construction will now be described with reference to FIG. 12. When an instruction to set the retrieval condition is generated by the user (1401), first as shown in FIG. 11, by which attribute the condition is set is selected (1402). Either one of a mode in which the area including the attribute set in step 1402 is retrieved at a position in one page and a mode in which such an area is retrieved by the number of areas including the set attribute is selected (1403). When retrieving at the position in one page, an area setting to decide in which area in one page the area having the set attribute exists is executed (1404). The setting of the retrieval area in step 1404 can be set as shown in FIG. 14. Reference numeral 1601 denotes a document of one page. In the diagram, mesh areas (1602, 1603, 1604) are selected retrieval areas. As shown on the right side in FIG. 14, a plurality of areas in the page can be selected. Those areas are not limited to blocks as shown in FIG. 14 but can be arbitrarily set by the user.

Figure 15:
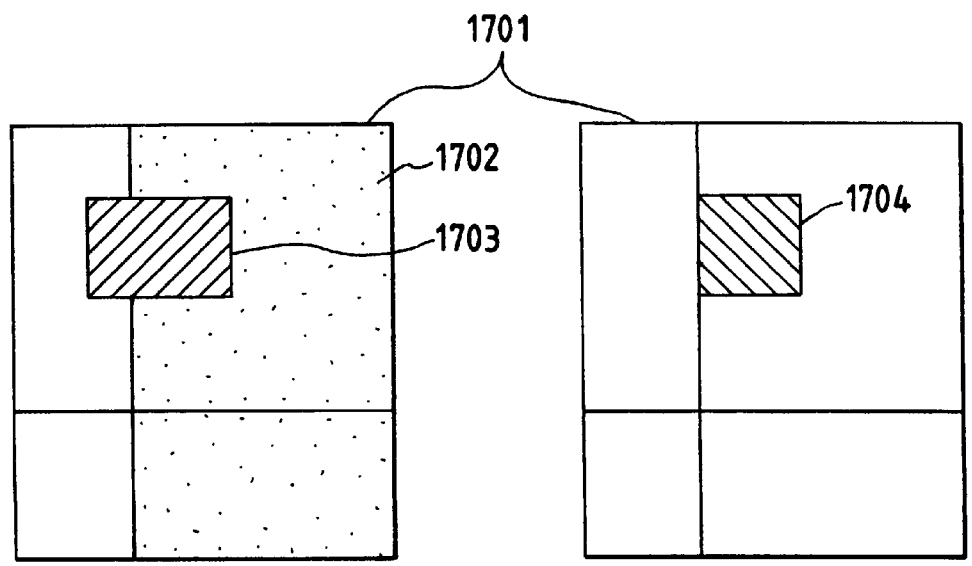
FIG. 15 is a diagram showing attributes of the document construction according to embodiment 3.
Figure 16:
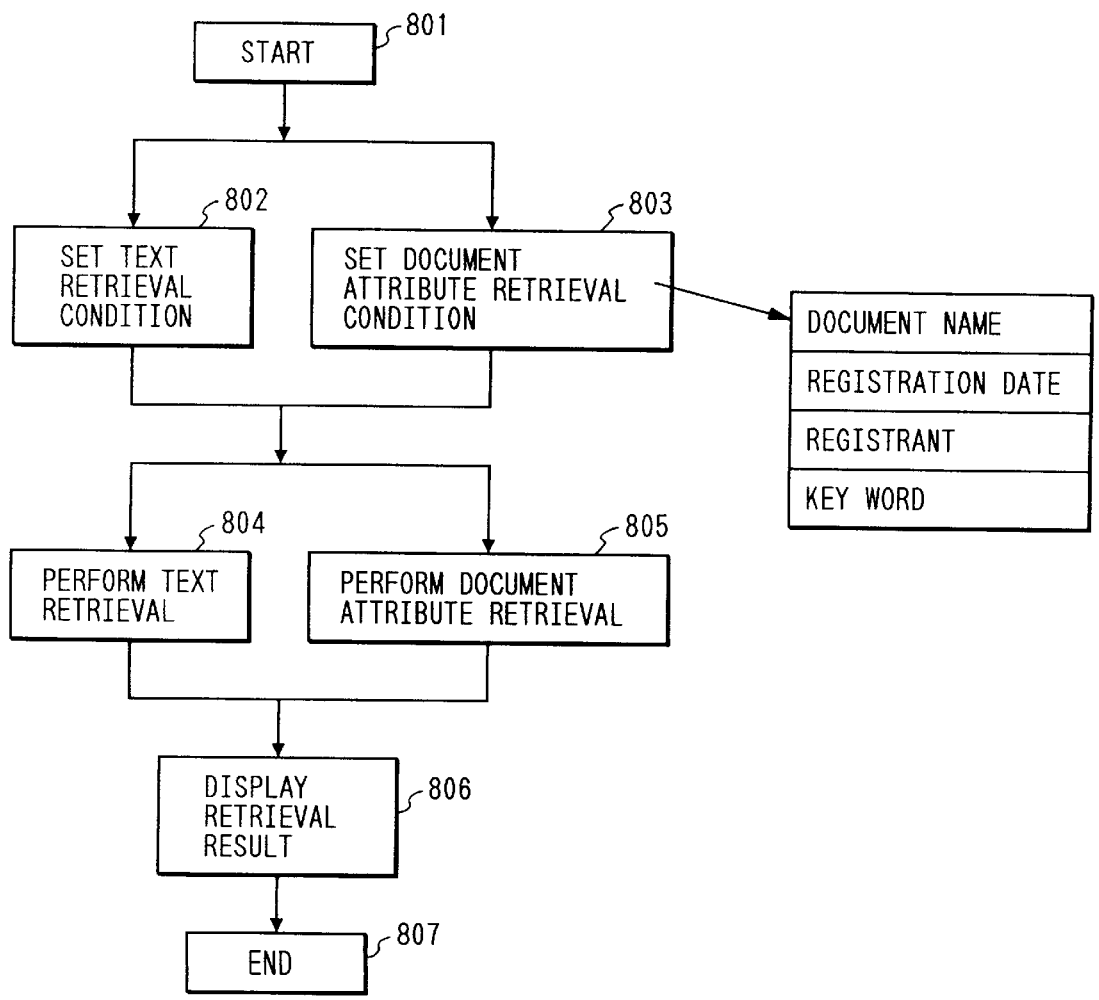
FIG. 16 is a flowchart showing a conventional retrieval method.

After the area setting step 1404, an area ratio between the area having the selected attribute in step 1402 and the retrieval area selected in step 1404 is set. For example, assuming that the area ratio is equal to 80%, this means that a state in which 80% or more of the area having the attribute that is set in step 1402 is included in the retrieval area set in step 1404 is used as a retrieval condition. FIG. 15 shows such an example. Reference numeral 1703 assumes an area having the attribute set in step 1402. Reference numeral 1702 denotes a retrieval area set in step 1404 and 1704 indicates an overlapped area of the areas 1702 and 1703. In a case of an area ratio of 80%, this means that a state in which the overlapped area 1704 is 80% or more of the area 1703 is set as the retrieval condition.

In the case where the method of retrieving by the number is selected in step 1403, whether the number of areas having the attribute set is the number of the whole of the document or the number in one page is selected (1406). In case of retrieving by the number of the whole of the document, the number of areas having the attribute selected in step 1402 or more existing in the whole of the document is set (1407). Similarly, in case of retrieving by the number in one page, the number of areas or more existing in one page is set (1408).

Figure 13:
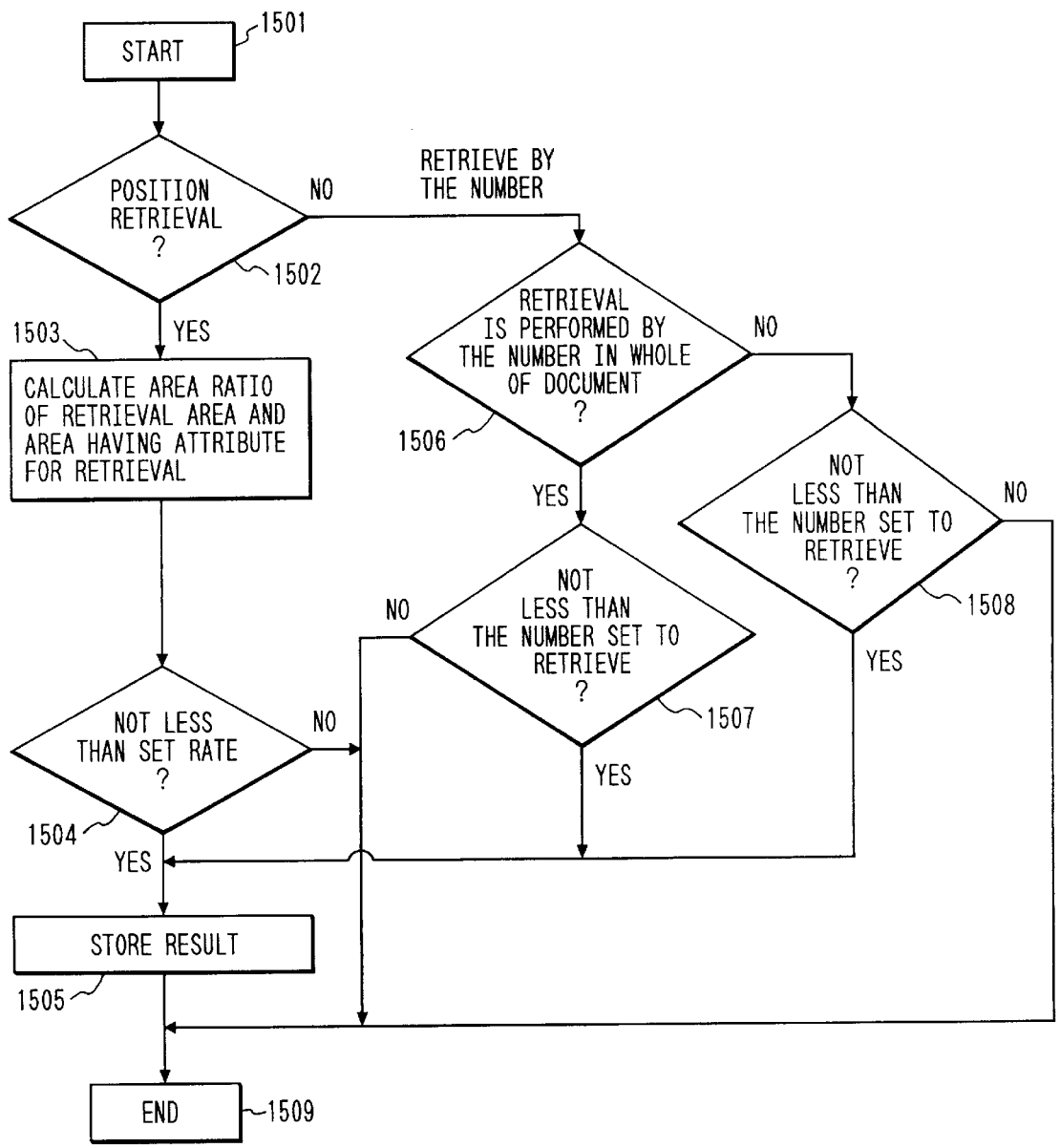
FIG. 13 is a flowchart showing the details of a document construction retrieval according to embodiment 3.

After the document construction retrieval condition as mentioned above were set (1409), a state in which the next retrieval is executed is shown in FIG. 13.

When the instruction to execute the retrieval is generated from the user, the retrieval is started (1501). First, a check is made to see if the retrieval condition by the position has been set or the retrieval condition by the number has been set (1502). In case of retrieving by the position, an area ratio between the retrieval area set in step 1404 and the area having the attribute set in step 1402 is calculated (1503). A check is made to see if the value of the calculated area ratio is not less than the area ratio set in step 1405 or not (1504). When the value is equal to or larger than the set ratio, it is regarded that the retrieval condition is satisfied, so that the result is stored in the RAM (1505). In case of retrieving by the number, a check is made to see if the condition set in step 1406 is the number in the whole of the document or the number in one page (1506). In accordance with the discrimination result, when the number of areas having the attribute set is equal to or larger than the number set in each of steps 1407 and 1408 (1507, 1508), it is regarded that the retrieval condition is satisfied, so that the retrieval result is stored (1505).

The retrieval operation shown in FIG. 13 as mentioned above is executed every document. The result stored in step 1505 is finally displayed as a retrieval result by the display (1208). The retrieval of one time is finished (1209).

Figure 12:
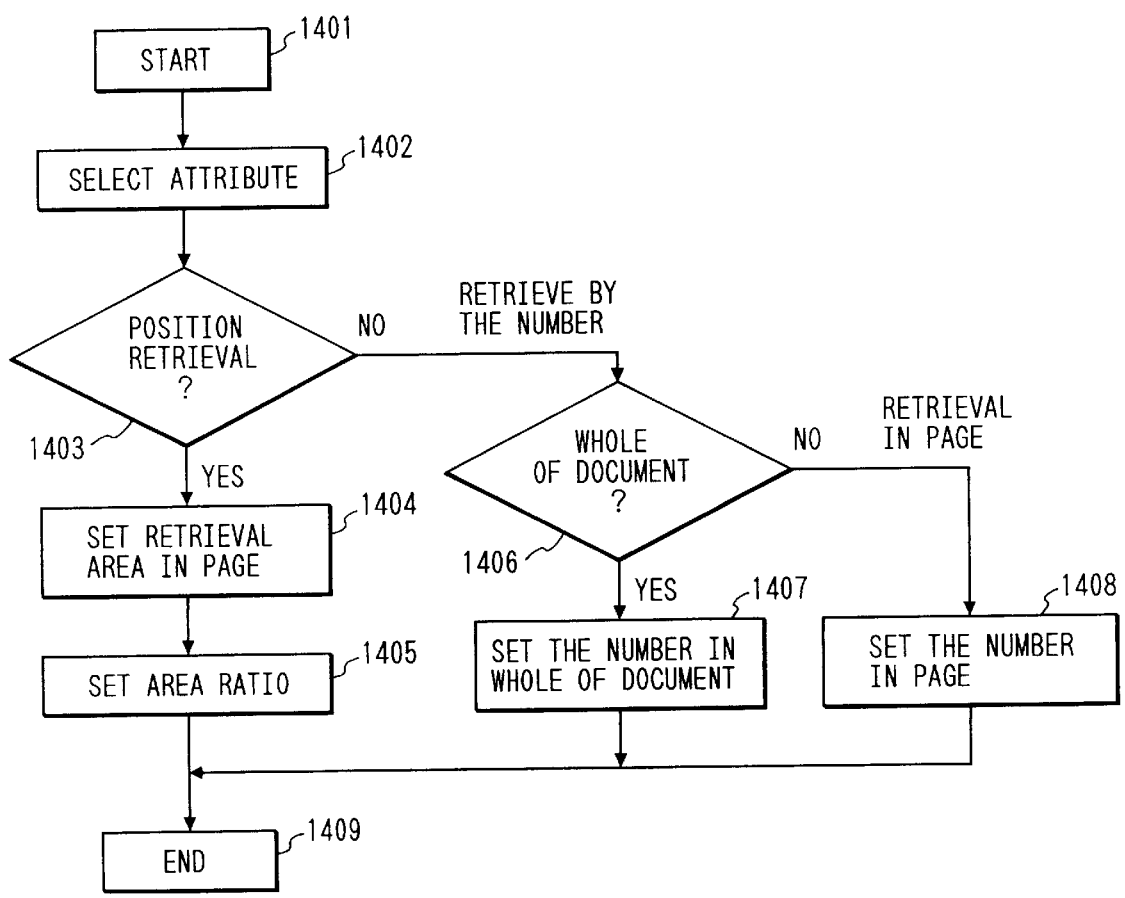
FIG. 12 is a flowchart showing a setting method of retrieval attributes according to embodiment 3.

The retrieval condition to be set in FIG. 12 can be obviously set with respect to a plurality of attributes and the retrieval of FIG. 13 is performed every setting of the retrieval condition.

Further, the document construction described in FIG. 11 is not limited to the document image data obtained by reading the document by the scanner and converting into the digital data but also the document data that is formed by a general application of a word processor or the like can be used. The retrieval method according to the invention can be applied to not only the document image data but also general application data.

The invention can be applied to a system constructed by a plurality of apparatuses or can be also applied to an apparatus comprising one equipment. Further, the invention is obviously accomplished by supplying a program to a system or an apparatus.

The present invention is not limited to the foregoing embodiments but many modifications and variations are possible within the spirit and scope of the appended claims of the invention.

What is claimed is:

1. An electronic filing system comprising:

managing means for managing an attribute in each area which includes an image or chart in each of a plurality of documents stored in a memory medium as document construction data;

input means for inputting a desired attribute and the number of areas of the attribute as a retrieval condition for retrieving the document stored in said memory medium; and retrieving means for retrieving a document according to the attribute and the number of areas input by said input means on the basis of the attribute and the number of areas input by said input means and the document construction data.

2. A system according to claim 1, wherein said retrieving means retrieves a document having the number of areas of the attribute input by said input means.

3. A system according to claim 1, further comprising:

selecting means for selecting whether the retrieving is executed for the document or a page of the document on the basis of the attribute and the number of areas input in said input means.

4. A method of retrieving a document in an electronic filing system, comprising the steps of:

managing an attribute in each area which includes an image or chart of each of a plurality of documents stored in a memory medium as document construction data;

inputting an attribute and the number of areas of the attribute as a retrieval condition for retrieving the document stored in said memory medium; and retrieving a document according to the attribute and the number of areas input in said inputting step on the basis of the attribute and the number of areas input by said inputting step and the document construction data.

5. A method according to claim 4, wherein said retrieving step retrieves a document having the number of areas of the attribute input in said inputting step.

6. A method according to claim 4, further comprising a step of selecting whether the retrieving is executed for the document or a page of the document on the basis of the attribute and the number of areas input in said input means.

7. An electronic filing system comprising:

managing means for managing an attribute in each area which includes an image or chart in each of a plurality of documents stored in a memory medium as document construction data;

selecting means for selecting whether the document is retrieved on the basis of a position of area of a designated attribute or an the basis of the number of areas of the designated attribute as a retrieving method for retrieving the document store din said memory medium;

input means for inputting a retrieval condition according to the retrieving method selected by said selecting means; and retrieving means for retrieving the document on the basis of the retrieval condition input by said input means.

8. A system according to claim 7, further comprising:

second selecting means for selecting whether the retrieving is executed for the document or a page of the document on the basis of the number of areas of the designated attribution when the retrieving method based on the number of areas of the designated attribution is selected.

9. A method of retrieving a document in an electronic filing system, comprising the steps of:

managing an attribute in each area which includes an image or chart of each of a plurality of documents stored in a memory medium as document construction data;

selecting whether the document stored in the memory medium is retrieved on the basis of a position of area of a designated attribute or on the basis of the number of areas of the designated attribute as a retrieving method for retrieving the document stored in the memory;

inputting a retrieval condition according to the retrieving method input in said selecting step; and retrieving the document on the basis of the retrieval condition input ins aid inputting step.

10. A method according to claim 9, further comprising a second selecting step of selecting whether the retrieving is executed for the document or a page of the document on the basis of the number of areas of the designated attribution when the retrieving method based on the number of areas of the designated attribution is selected.

* * * * *

UNITED STATES PATENT AND TRADEMARK OFFICE
CERTIFICATE OF CORRECTION

PATENT NO. : 5,926,824

DATED : July 20, 1999

INVENTOR(S) : YASUHIKO HASHIMOTO

It is certified that error appears in the above-identified patent and that said Letters Patent is hereby corrected as shown below:

COLUMN 5

Line 49, "not" should read --no--.

COLUMN 7

Line 13, "instructing" should read --entry of instructions--.

COLUMN 10

Line 49, "store din" should read --stored in--.

COLUMN 12

Line 2, "ins aid" should read --in said--.

Signed and Sealed this

Eleventh Day of April, 2000

Attest:

Q. TODD DICKINSON

Attesting Officer

Director of Patents and Trademarks